G. E. PERSON.
BUTCHER'S GAMBREL.
APPLICATION FILED JUNE 18, 1913.
1,117,436. Patented Nov. 17, 1914.
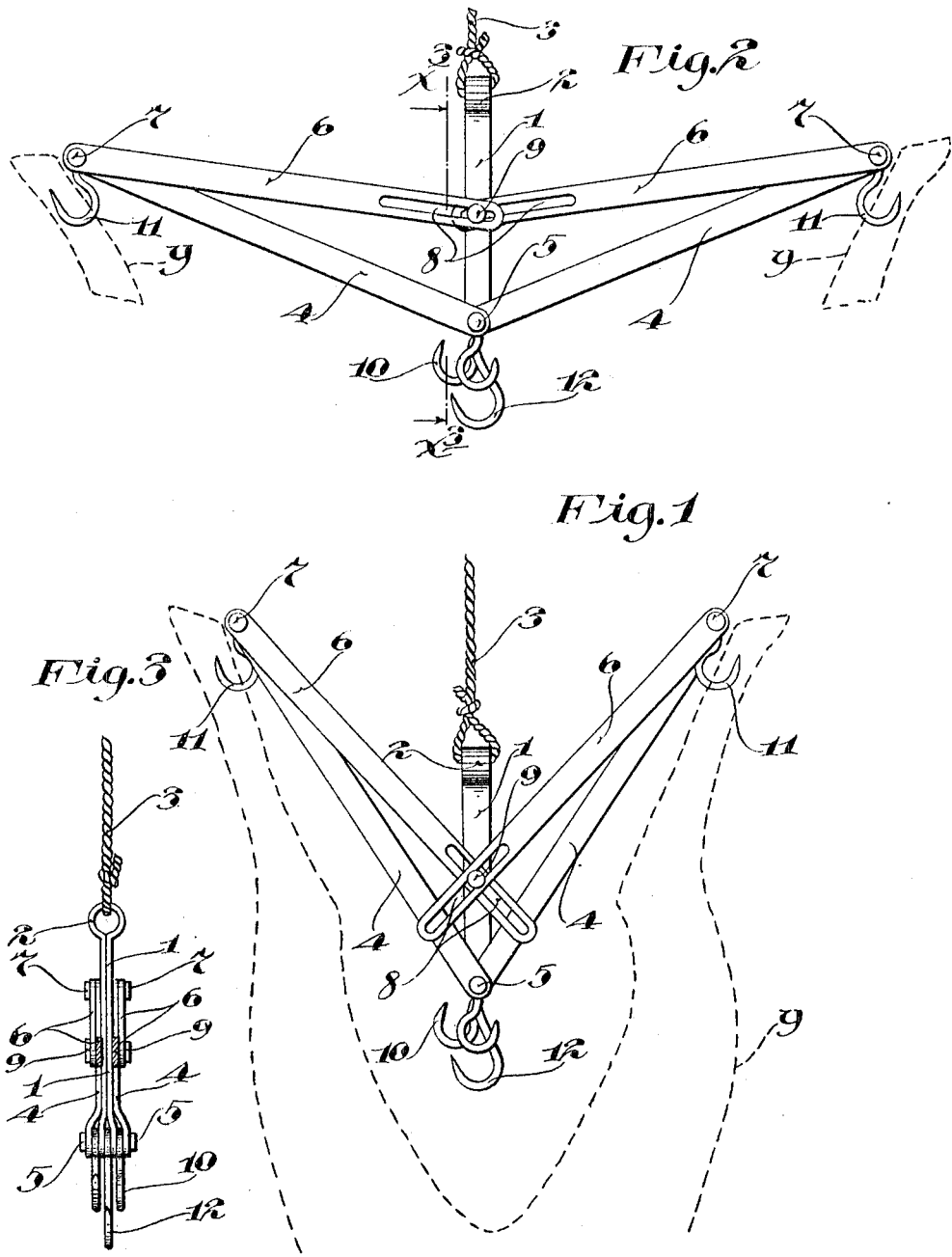

UNITED STATES PATENT OFFICE.

GUSTAF E. PERSON, OF BRADDOCK, NORTH DAKOTA.

BUTCHER'S GAMBREL.

1,117,436.  Specification of Letters Patent.  Patented Nov. 17, 1914.

Application filed June 18, 1913. Serial No. 774,386.

*To all whom it may concern:*

Be it known that I, GUSTAF E. PERSON, a citizen of the United States, residing at Braddock, in the county of Emmons and State of North Dakota, have invented certain new and useful Improvements in Butchers' Gambrels; and I do hereby declare the following to be a full, clear, and exact description of the invention, such as will enable others skilled in the art to which it appertains to make and use the same.

My invention relates to improvements in butchers' gambrels and, to this end, it consists of the novel devices and combinations of devices hereinafter described and defined in the claims.

The invention is illustrated in the accompanying drawings, wherein like characters indicate like parts throughout the several views.

Referring to the drawings: Figure 1 is a side view of the invention in a folded position, having secured thereto but not supporting the hind quarters of a beef, indicated by means of dotted lines; Fig. 2 is a view corresponding to Fig. 1, but showing the device in an operative position and supporting the beef; and Fig. 3 is a transverse vertical section, taken on the line $x^3$ $x^3$ of Fig. 2.

The numeral 1 indicates the body member of the improved gambrel, comprising a flat metallic strap bent upon itself and having, at its intermediate portion, an eye 2 to which is applied a cable 3, for supporting the device. Of course, any other suitable means may be provided for supporting the device. A pair of oppositely projecting supporting arms 4 are pivotally secured, at their inner ends, by a rivet 5 to the lower end of the body member 1. For limiting the downward movement of the arms 4, a pair of links 6 is provided. The outer ends of these links 6 are pivotally secured to the outer ends of the arms 4 by rivets 7, and their inner ends are provided with longitudinally extended slots 8, through which is passed a rivet 9 secured to the intermediate portion of the body 1. Each of the arms 4 and links 6 is, as shown, made up of a pair of laterally spaced bars located one on each side of the body member 1. To the rivet 5 is secured a pair of reversely formed hooks 10, and to each rivet 7 is secured a hook 11. Also secured to the rivet 5 is a large hook 12 provided for holding small meats.

In supporting large animals, such as cattle, from the improved gambrel, said gambrel is folded and the hooks 11 are passed through the animal's hocks, as indicated by dotted lines in Fig. 1. After the animal is secured in position, the weight thereof will automatically separate the arms 4, thereby supporting and spreading the animal, as indicated in Fig. 2, making it easy to skin and split the same. When a very large animal is hung on the improved mambrel, or when a single small animal is supported from each arm 4, the slotted links 6 will limit the spreading movement of the arms 4. In case a small animal is supported from each of the arms 4, one of the hooks 10 and one of the hooks 11 will be used.

The improved device, while extremely simple and of comparatively small cost to manufacture, is thought to be highly efficient for the purpose had in view.

What I claim is:

1. A butcher's gambrel comprising a body member, a pair of oppositely extended supporting arms pivotally secured, at their inner ends to said body member, and means limiting the downward swinging movement of said arms, said arms having at their inner and outer ends supporting hooks.

2. A butcher's gambrel comprising a body member, a pair of oppositely extended hook-equipped supporting arms pivotally secured at their inner ends to said body member, and links pivotally connecting the outer ends of said arms to said body member, one of the pivotal connections of each of said links having a limited endwise-sliding movement, said links limiting the downward swinging movement of said arms.

In testimony whereof I affix my signature in presence of two witnesses.

GUSTAF E. PERSON.

Witnesses:
H. W. ALLEN,
J. A. ALLENSWORTH.

Copies of this patent may be obtained for five cents each, by addressing the "Commissioner of Patents, Washington, D. C."